United States Patent Office 3,106,597
Patented Oct. 8, 1963

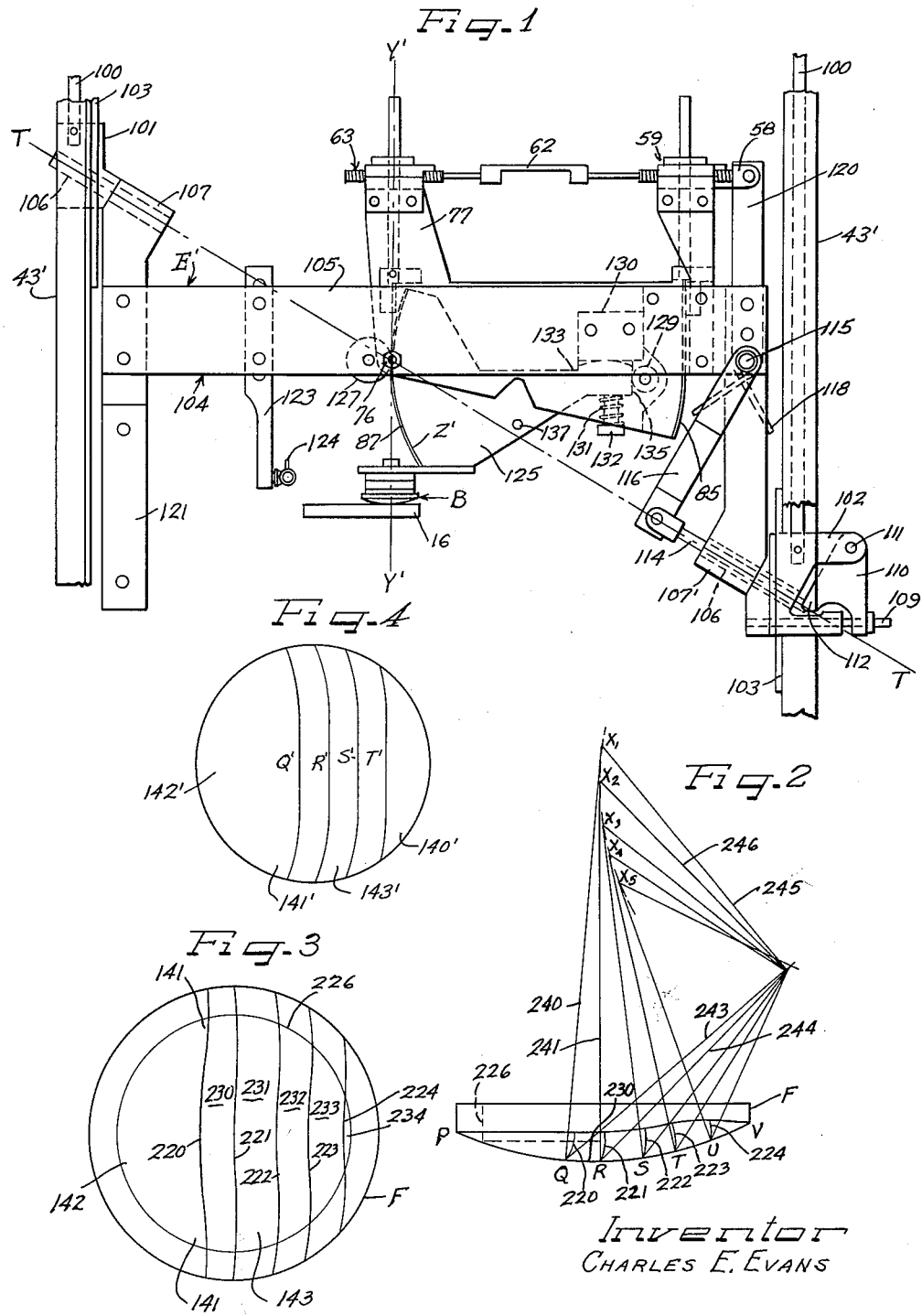

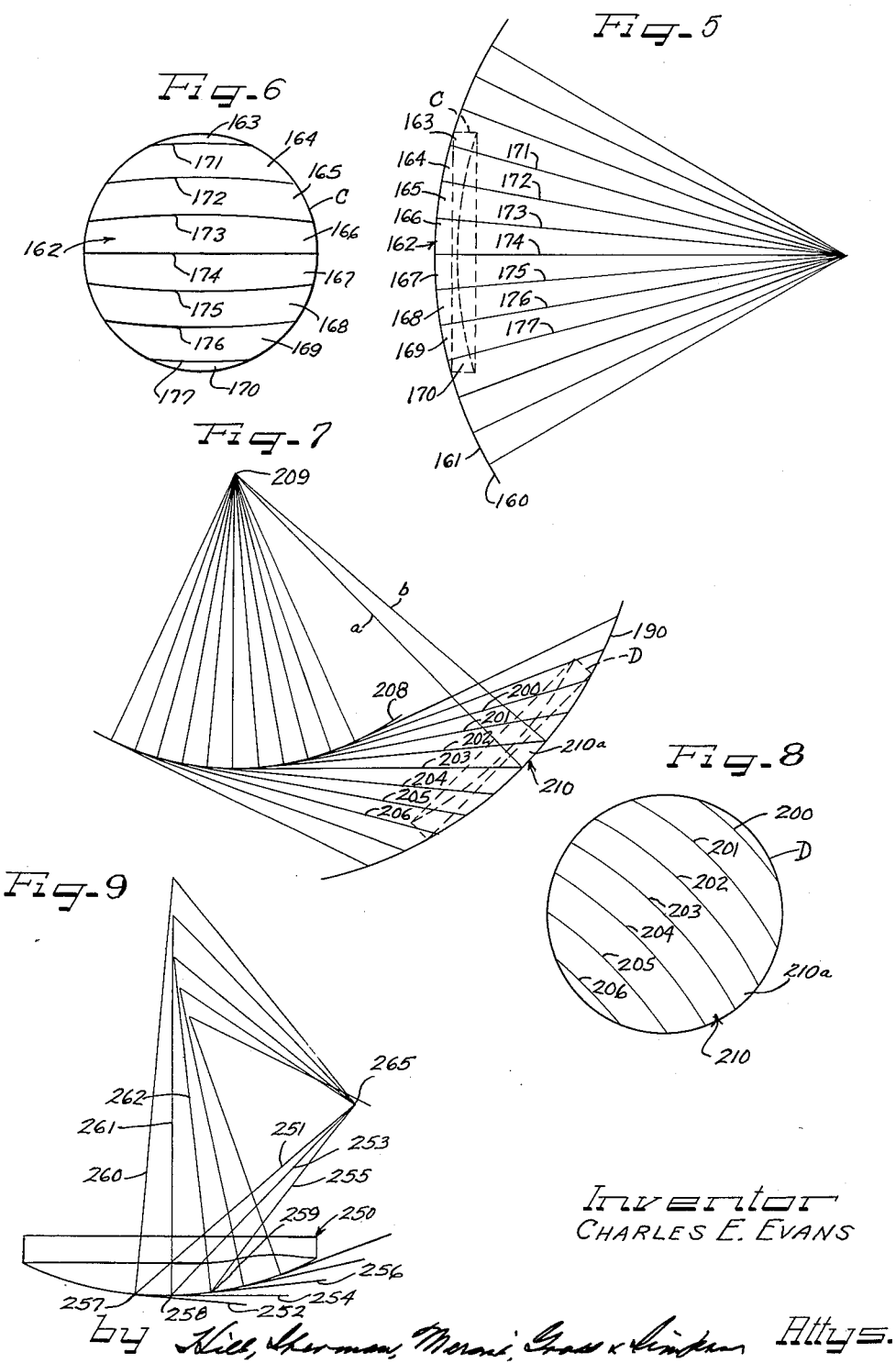

3,106,597
MULTIFOCAL OPHTHALMIC LENS
Charles E. Evans, Rte. 2, Box 516, Naperville Township, Du Page County, Ill.
Filed July 16, 1956, Ser. No. 597,980
1 Claim. (Cl. 88—54)

This invention relates to an element having a surface of predetermined curvature, and particularly relates to an optical element such as a spectacle lens.

It is an important object of the present invention to provide an improved optical element having a surface particularly adapted for use in a spectacle lens.

It is another object of the present invention to provide a lens having improved characteristics with respect to side vision as a spectacle lens.

It is another object of the present invention to provide an optical surface the dioptric curvature of which, at any one point on the principal vertical meridian, is exactly the same horizontally as vertically.

It is still another object of the present invention to provide a lens surface composed of spherical orange segment-like sections.

It is yet another object of the present invention to provide an optical element having a surface in which each segment extends between two transversely curved planes, each of which, in the plane of the principal meridian, coincides with one of two convergence straight lines, both of which are tangent to one circle scribed about the center of the spherical segment.

Other objects, features and advantages of the present invention will be more fully apparent from the following detailed description taken in connection with the accompanying drawings, in which:

FIGURE 1 is a fragmentary front elevational view of a machine adapted to produce an optical element in accordance with one embodiment of the present invention;

FIGURE 2 is a diagrammatic view illustrating an edge elevation of a lens produced by the machine of FIGURE 1;

FIGURE 3 is a diagrammatic bottom plan view of the lens of FIGURE 2;

FIGURE 4 is a diagrammatic plan view of a lens produced by a machine similar to that shown in FIGURE 1 but with a horizontal axis of oscillation and represents a second embodiment of the present invention.

FIGURE 5 is a diagrammatic illustration of a spherical lens such as would be produced by the machine of FIGURE 1 but with a horizontal axis of oscillation;

FIGURE 6 is a diagrammatic plan view of the spherical lens of FIGURE 5;

FIGURES 7 and 8 show a spherical lens of constant dioptric power such as would be produced by the machine of FIGURE 1, with the axis of oscillation at 45 degrees and the lens moved about the pivot 76; and FIGURE 9 is a partial diagrammatic view similar to FIGURE 2.

An understanding of the optical element of the present invention will be assisted by the following description of an apparatus for producing the element. Other suitable apparatus is illustrated in my copending application Serial No. 262,068 filed Dec. 17, 1951, now Patent No. 2,755,602 issued July 24, 1956, of which the present application is a continuation-in-part, and the disclosure of this copending application is incorporated herein by reference.

While certain surfaces in accordance with the present invention are produced by the use of a carriage such as illustrated at E' in FIGURE 1 oscillating on a horizontal axis, other important features of the present invention are produced by the oscillation of the carriage about an inclined axis T—T relative to the plane of the grinding surface. The apparatus of FIGURE 1 is adapted to generate an involute of an involute curve. It has been found that the dioptric power of a lens having a contour which is an involute of an involute will have a more uniform rate of change.

The ratchet mechanism for raising and lowering the inner jig assembly E' and the drive therefor comprises outer ratchet screws 100 which are connected to bearing blocks 101 and 102 which are vertically slidable in spaced pairs of uprights 43' in guide ways defined by plates 103. Carriage 104 comprising side bars 105 is pivotally mounted in the bearing blocks 101 by means of tubular shafts 106 carried by the carriage mounting arms 107 and 107'. The carriage 104 is thus mounted for oscillation about an obliquely extending axis T—T.

For driving the inner ratchet mechanism, a rod 109 extends through the lower right hand bearing block 102 and is actuated in a reciprocating manner to pivot a crank 110 about a pin 111 carried by the bearing block 102. An extension 112 of the crank 110 is connected to a rod 114 extending through the tubular shaft 106 of the carriage mounting arm 107'. Reciprocation of the rod 114 along the axis of oscillation, T—T, rocks the shaft 115 pivotally mounted by the carriage 104 due to a rigid connection between the shaft 115 and the arm 116 which is pivotally connected to the rod 114. A wire biasing spring 118 bears against the carriage mounting arm 107 and the arm 116 to bias the arm 116 in the counterclockwise direction and to bias the actuating rod 109 outwardly away from upright 43'. Rocking movement of the shaft 115 is transmitted to extension 58 of the ratchet 59 by means of a vertically extending arm 120 to actuate the inner-ratchet mechanism. An extension 121 depending from the left side of the carriage 104 serves to balance the carriage in its oscillation about the axis T—T.

An adjustable hanger bar 123 depends from the cross bars 105 of the carriage for universal connection at its lower end with an actuating rod which is adjusted to swing the carriage in the desired manner. The universal joint connection is indicated at 124.

In the present embodiment, an inner plate member 125 is provided which is mounted for simulated rolling movement to generate an involute of an involute. To this end, an outer margin Z' of the inner plate member 125 adjacent the pivot 76 defines an involute curve. This involute margin Z' is constrained to simulate rolling on the axis Y'—Y' normal to the grinding wheel surface.

In the present instance the constraining means comprises a roller 127, rotatably mounted by the cross bars 105, which is tangent to the vertical line Y'—Y', an opposing roller 129, guide block 130 and spring 131. The spring 131 is mounted by means of a bolt 132 extending through the end of the plate member through an aperture therein which is designed to afford adequate clearance for rocking of the plate member. The bolt 131 is secured in the constraining block 130. It will be observed that the margin 133 of the plate member 125, which faces the constraining block 130, is arcuate and may be of such curvature as to tend to promote the accuracy of simulated rolling of the plate member 125. Specifically, the curvature of the margin 133 is such that for a perfectly simulated involute, the margin 133 will perfectly accommodate the proper movement of the end portion of the plate 125.

The same may be true of the margin 135 contacting the roller 129. If the margins 133 and 135 are properly designed, there need be no looseness between the constraining member or means and the plate 125 during the generation of the curve.

The plate member 125 is so constrained that, for example, upon the intermittent raising of the flexible strap 87 secured to the involute margin Z', the constraining members will ideally retain contact with the plate member 125 and constrain it to simulate an involute curve. The spring 131 is of sufficient size to substantially resist movement of the plate 125 downward under the urging of a counter balance weight which may be connected to the opening 137 in the plate 125.

Operation of Machine of FIGURE 1

During grinding of a constant radius portion of the lens B, the connecting bar 62 is removed and the ratchet mechanism 59 raises or lowers the outer plate 77, relative to grinding wheel 16, the inner plate 125 and the lens carrier assembly including lens blank B moving in fixed relation therewith. For example, the ratchet mechanism 59 may raise strap 85 connected to the plate 77 one-thousandth of an inch for each half oscillation of the carriage 104 on the axis T—T to progressively move plate 77 and lens blank B about pivot 76.

If it is now desired to generate an involute of involute, namely, the involute of the margin Z' of the plate member 125, ratchet mechanism 59 is placed in neutral, the connecting bar 62 is connected and the ratchet mechanism 63 is energized to progressively raise the plate 125 at the end of each half oscillation about axis T—T while the entire inner jig assembly E' is lowered in step with mechanism 63 by means of the ratchet screws 100. If the margin Z' were a circular arc, an involute of a circular arc would be generated.

In accordance with the method as practiced by this machine, a series of minutely or infinitesimally narrow, substantially spherical segments of gradually varying radius are generated. The spherical centers of all these segments lie in the same plane with each segment being tangent to adjacent segments on a common meridian lying in this plane, for example meridian PV in FIGURE 2. The area of each segment is determined by its natural intersection with the adjacent spherical segments. The lines of intersection of the adjacent segments would correspond in contour substantially to lines 220–224 in FIGURE 3, for example. In FIGURE 2 is illustrated the principle of generation of an involute of an involute. For example, if the curve $X_1$, $X_2$, $X_3$, $X_4$, $X_5$ in FIGURE 2 is an involute corresponding to the involute margin Z' and the line $X_1Q$ is considered to represent a string to be wrapped onto the involute curve $X_1$, $X_2$, $X_3$, $X_4$, $X_5$ it will be observed that the arc QRSTU is generated, the line $X_2R$ extending tangent to the involute curve $X_1$–$X_5$ at point $X_2$, the line $X_3S$ extending tangent to the curve $X_1$–$X_5$ at point $X_3$ the line $X_4T$ extending tangent to the involute curve at point $X_4$ and the line $X_5U$ being tangent to the curve at $X_5$.

FIGURE 3 illustrates certain lines of natural intersection such as 220–224 between adjacent segments generated by the machine of FIGURE 1. FIGURE 4 illustrates corresponding lines Q', R', S', T', in a lens generated by a machine having the axis of oscillation corresponding to axis T—T in FIGURE 1 parallel to the grinding surface. It is found that a lens of the type shown in FIGURE 3 if provided with a lower constant dioptric power reading area will provide an area which is somewhat more ample than the area 140' of the lens of FIGURE 4. The corner portions 141 of the constant dioptric power distance area 142 also are more ample than the corner portions 141' of the distance area 142' of FIGURE 4 and thus provide better distance vision. Further, there is less distortion in the intermediate dioptric curvature portion 143 than in the corresponding portion 143'. It has been found in practice that a lens produced by the machine of FIGURE 1 is superior to that produced by a machine with a horizontal axis in these respects.

It will further be observed that the lens shown in FIGURE 3 is theoretically generated in one direction by a generating line such as 243 extending from a particular point in the principal meridian such as Q to the axis T—T as indicated by the line 245 and at right angles to the axis. This generating line 243 is then oscillated on the axis represented by line 245 to move the lens blank across a grinding surface lying at right angles to the line 240. The transverse generating line such as 243 extends obliquely to the radius of the curvature line 240 of the principal longitudinal meridian PV at the point Q. It will be observed that transverse generating axis 245 intersects the radius of curvature line 240 at $X_1$.

While generation of convex lens surfaces have been described, concave lens surfaces could also be generated by the use of a suitable grinding surface, such as a spherical grinding surface and with other suitable adjustments of the jig mechanism. Also, parabolic or cylindrical lenses could be generated by a suitable adjustment of the jig mechanism. The invention is not limited to lenses, since dies for plastic lenses could be formed by means of the apparatus of my invention.

FIGURES 5 through 8 illustrate certain principles and concepts in the construction of lenses in accordance with the present invention. FIGURE 5 illustrates what may be thought of as a glass sphere 160 built up of segments similar to the segments of an orange. Each segment has a generally wedge shaped cross section and has an end face portion 161 extending over one-half the circumference of the sphere. If a lens C is cut out of this sphere, its face 162 has the appearance shown in FIGURE 6 and constitutes a spherical surface of uniform radius. Such a lens could be ground on the machine with a horizontal axis of oscillation as shown in FIGURE 1 of my application Serial No. 262,068 above referred to. The lens C would then be built up of laminated wedge shaped segments such as 163–170 indicated in FIGURE 6, but in practice each segment would have a very minute width. The planes such as 171–177 in FIGURE 5 appear as curved lines in FIGURE 6 on the surface 162, and these curved lines correspond to lines which would be traced on a lens if the grinding surface in FIGURE 1 of my copending application were coated with chalk and spaced sectors of the lens swung across the grinding surface. An actual lens according to the present invention thus consists of a very large number of spherical sectors such as illustrated at 163–170 but of greatly reduced width. It will be understood that the present invention contemplates forming the segments such as 163–170 on gradually varying radii, for example the radii varying as the involute of a circular arc.

FIGURE 7 illustrates a glass sphere 190 built up of laminated wedge shaped segments defined by planes such as 200–206 extending tangent to the circle 208 scribed about the center 209 of the sphere. A lens D is shown cut out of this sphere and its face 210 has the appearance shown in FIGURE 8. Such a lens could be ground on the machine shown in FIGURE 1 of the present case. The axis T—T would extend at an angle of 45° to the grinding wheel surface to produce the lens D of FIGURES 7 and 8.

FIGURES 5 and 7 show successive spherical surfaces, all of the same radii. In FIGURE 5 the spherical surface 164, would be included between two planes perfectly flat in both directions, and corresponding with radii lines 171 and 172, and the surface 165, would be included between similar planes, coinciding with radial lines 172 and 173. In FIGURE 7, the spherical surfaces, such as 210a, would be included between perfectly flat planes, coinciding to such lines as 202 and 203. If sections of diminishing radii were cut on corresponding flat planes, they would not fit together, except on the principal meridian. However, if these planes were curved transversely, as indicated in FIGURE 4, by lines Q'R'S'T' and in FIG. 3, by lines 220, 221, 222, 223 and 224, and if these planes were curved to coincide with the natural intersection of the adjacent surfaces, the adjacent sections would fit together. By forming each section of a surface of gradually varying curvature of minute height or width, and by making the change very gradual in radius, the sections are merged together in a continuous surface with very little error, even at the margins.

FIGURES 2 and 3 show a lens F ground on a machine of the type shown in FIGURE 1 with the axis T—T at 45 degrees. The intersection lines 220–224 shown in FIGURE 3 can be established by putting chalk on the grinding wheel, and swinging the lens over the grinding wheel and allowing the lens to contact the wheel only at spaced intervals along the surface of the lens. When an oversize blank of 2½ inch diameter is used, the lens may be later cut down to a 2 inch diameter as indicated by the circle 226 in FIGURE 3. The lines 220–224 define surface segments 230–234 which correspond generally to the surface segments defined by the planes 200–206 in FIGURE 7 where they intersect with the surface of the lens D in FIGURE 8. Each segment of the surface in FIGURE 3 extends between two transversely curved lines such as 220—221. The corresponding radius lines, such as 240—241 in FIGURE 2, for a sufficiently small segment, would intersect at the center of curvature of the surface 230, in a manner analogous to the intersection of the lines a and b in FIGURE 7, at the center of curvature of the surface portion 210a in FIGURE 7. The lines such as 243 and 244, defining the segment 230 in FIGURE 2, would also substantially coincide in the plane of the principal meridian. It will be understood that the line 245 in FIGURE 2 corresponds to the orientation of the axis T—T of FIGURE 1 during the grinding of an arc on the transverse generating line 243 and that the line 246 coincides to the axis T—T of oscillation of the carriage of FIGURE 1 during the grinding of an arc on the transverse generating line 244.

FIGURE 9 illustrated in a diagrammatic fashion the way in which the grinding wheel may make successive cuts on a lens blank 250 as viewed at the principal meridian. The lens blank may first be swung on a transverse generating line 251 to grind the lens blank to coincide with the plane 252. The lens or grinding wheel may then be shifted and swung on the radius 253 to conform the blank to the surface 254. The blank is again relatively shifted and swung on the transverse generating line 255 to conform the blank to the plane 256. The resultant lens will be made up of arcs such as 257, 258 and 259 having radii 260, 261, and 262 respectively where they intersect the plane of the principal meridian. The successive arcs 257, 258 and 259 will merge with adjacent arcs (not shown) to form a substantially continuous surface of gradually varying curvature. It will be understood of course that the radius lines such as 260 represent the radius and center of curvature of the arc 257 only at the principal meridan of the lens or surface being generated since the actual center or transverse generating point indicated at 265 about which the arc 257 was generated lies at an angle to the radius line 260. Thus the arcs such as 257 in FIGURE 9 will extend along the lens blank with their center lines disposed in the manner indicated by the line 220 in FIGURE 3, for example, and each surface such as 257 will vary in its height or width at different portions transversely of the lens in the manner indicated for the sector 230 in FIGURE 3.

It will be understood that modifications and variations may be effected without departing from the scope of the novel concepts of the present invention.

I claim as my invention:

A multifocal ophthalmic lens having a surface with a first area of constant dioptric power and a second area of varying dioptric power adjacent said first area, said areas each being symmetrical with respect to a principal meridian of said surface, said surface being defined by a series of infinitesimally narrow segments extending transversely and disposed symmetrically with respect to said principal meridian, each segment being defined by a generating axis lying in the plane of the principal meridian of the surface and a grinding plane disposed at right angles to the plane of the principal meridian and at an acute angle to said generating axis, each segment continuously conforming to said grinding plane over its entire extent both transversely and parallel to the principal meridian as the segment is swung about said axis at a fixed characteristic distance from said axis, the marginal line between each two adjacent segments of said surface conforming to said grinding plane as each of the two adjacent segments is swung at its respective characteristic distance from said axis, the characteristic distance being a fixed distance for the segments defining said first area and a distance progressively deviating from said fixed distance for the respective segments of said second area which are successively further from said first area, the boundary line between the first area and the second area as projected onto a plane at right angles to the plane of the principal meridian having first length portions of substantial length in comparison to the transverse extent of said segments on each side of the principal meridian extending substantially along an arcuate path having a tangent line at right angles to the principal meridian touching said arcuate path at the principal meridian with said arcuate path deviating from said tangent line in the direction toward said second area to provide relatively ample corner portions for the first area at each side of the principal meridian where the first area joins said second area, and having more remote second length portions of substantial length extending from the respective first length portions predominantly in a direction generally parallel to said tangent line.

References Cited in the file of this patent

UNITED STATES PATENTS

| | | |
|---|---|---|
| 1,143,316 | Poullain et al. | June 15, 1915 |
| 2,001,952 | Birchall | May 21, 1935 |
| 2,109,474 | Evans | Mar. 1, 1938 |